(12) United States Patent
Lehtonen et al.

(10) Patent No.: US 11,904,286 B2
(45) Date of Patent: Feb. 20, 2024

(54) AUTOMATED SOLUTION DISPENSER

(71) Applicant: accroma labtec Ltd., Muttenz (CH)

(72) Inventors: Ville Lehtonen, Arlington, MA (US); Michal Wozny, Oxford (GB); Jochen Klingelhoefer, Somerville, MA (US); Camilla Oxley, Malvern, PA (US)

(73) Assignee: accroma labtec Ltd., Muttenz (CH)

( * ) Notice: Subject to any disclaimer, the term of this patent is extended or adjusted under 35 U.S.C. 154(b) by 842 days.

(21) Appl. No.: 16/362,999

(22) Filed: Mar. 25, 2019

(65) Prior Publication Data

US 2019/0351383 A1 Nov. 21, 2019

Related U.S. Application Data

(63) Continuation of application No. 13/980,855, filed as application No. PCT/GB2012/050114 on Jan. 19, 2012, now Pat. No. 10,286,371.

(30) Foreign Application Priority Data

Jan. 21, 2011 (GB) ..................................... 1101075

(51) Int. Cl.
*B01F 35/71* (2022.01)
*G01G 11/08* (2006.01)
*G01G 19/22* (2006.01)

(52) U.S. Cl.
CPC .......... *B01F 35/714* (2022.01); *G01G 11/086* (2013.01); *G01G 19/22* (2013.01)

(58) Field of Classification Search
CPC ............ B01F 15/0216; B01F 15/00025; B01F 15/00194; B01F 15/00285; B01F 13/1061;

(Continued)

(56) References Cited

U.S. PATENT DOCUMENTS 2,517,456 A 8/1950 Wherrett
3,058,622 A * 10/1962 Ballestra ............... B01F 3/1271
222/77

(Continued)

FOREIGN PATENT DOCUMENTS

CN 1050831 A 4/1991
CN 2423282 Y 3/2001

(Continued)

OTHER PUBLICATIONS

"Office action dated Sep. 5, 2018 for U.S. Appl. No. 13/980,855.".

(Continued)

*Primary Examiner* — Marc C Howell
(74) *Attorney, Agent, or Firm* — Amster, Rothstein & Ebenstein LLP

(57) ABSTRACT

The present invention relates to an automated solution dispenser for dispensing a solution having a defined list of characteristics. In particular, the automated solution dispenser according to the present invention is provided with one or more of the following, modules: Central Mixing Chamber (CMC), Flush and Verification System (FVS), Liquid Handling System (LHS), Control System (CS), Pivot Pipe System (PPS), Solid Handling System (SHS) (which includes a Delivery mechanism and a Measuring mechanism), a Bottle Handling System (BHS), a Water Purification System (WPS) and Bottle Marking/Label (BM). The combination of one or more of these modules enables the automation of the creation of solution having the required characteristics.

17 Claims, 12 Drawing Sheets

Figure 1:
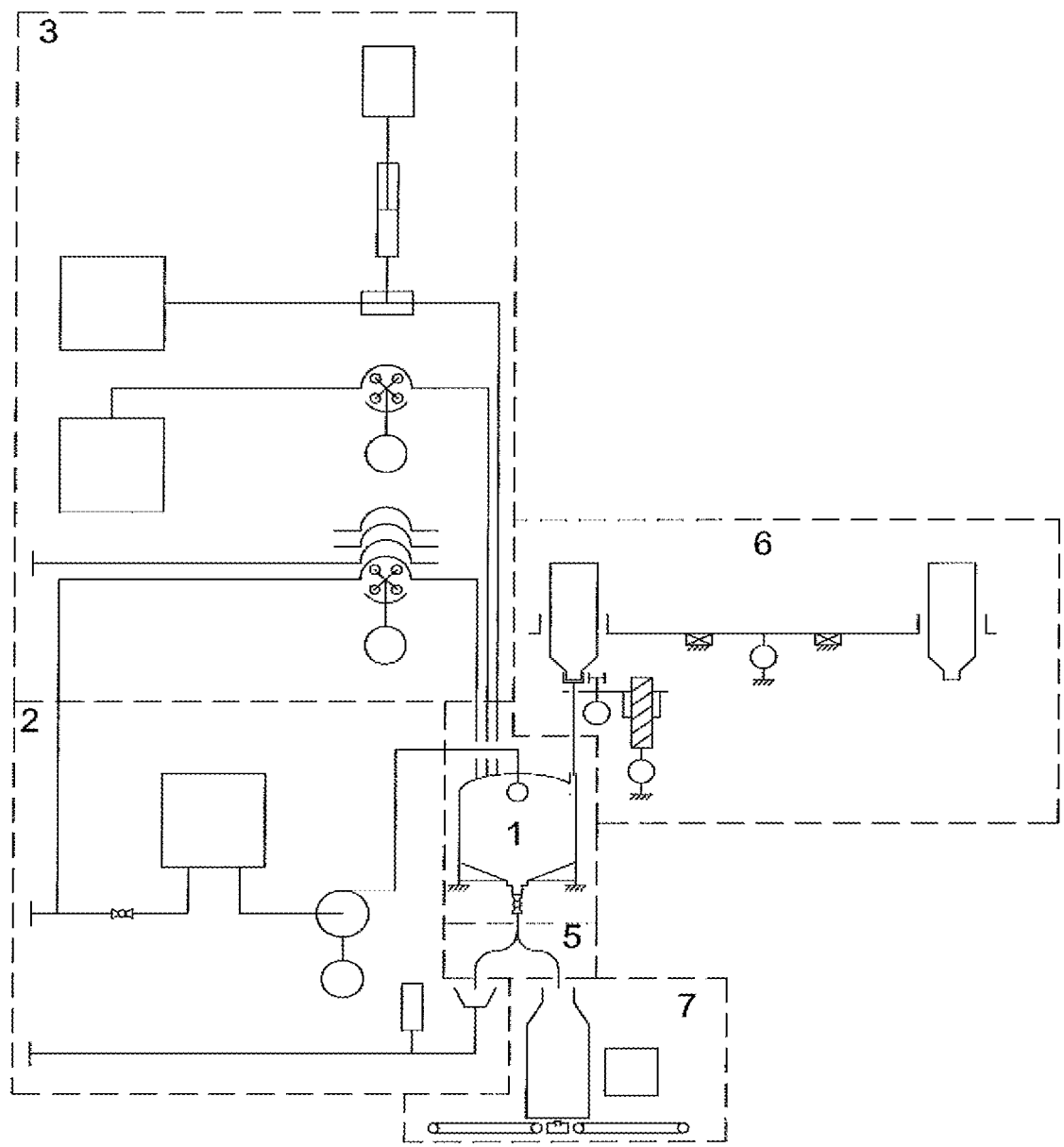

(58) Field of Classification Search
CPC .............. B01F 13/1063; B01F 13/1058; B01F 13/1055; B01F 13/1066; B01F 35/714; B01F 35/1452; B01F 35/247; B01F 35/2202; B01F 33/844; B01F 33/8442; B01F 33/841; B01F 33/84; B01F 33/846
USPC .............................................. 366/151.1, 138
See application file for complete search history.

(56) References Cited

U.S. PATENT DOCUMENTS

| | | | |
|---|---|---|---|
| 3,744,768 | A | 7/1973 | Kauffman et al. |
| 3,899,915 | A | 8/1975 | Williams, Jr. et al. |
| 3,936,271 | A | 2/1976 | Statter |
| 4,091,834 | A | 5/1978 | Frigato |
| 4,443,109 | A | 4/1984 | Watts |
| 4,525,071 | A | 6/1985 | Horowitz et al. |
| 4,627,225 | A | 12/1986 | Faller et al. |
| 4,830,508 | A | 5/1989 | Higuchi et al. |
| 4,859,072 | A | 8/1989 | Fey et al. |
| 4,964,185 | A | 10/1990 | Lehn |
| 5,052,486 | A | 10/1991 | Wilson |
| 5,129,418 | A | 7/1992 | Shimomura et al. |
| 5,366,896 | A | 11/1994 | Margrey et al. |
| 5,626,422 | A | 5/1997 | Adamo et al. |
| 5,879,079 | A | 3/1999 | Hohmann et al. |
| 5,882,589 | A | 3/1999 | Mariotti |
| 6,572,255 | B2 | 6/2003 | Husher |
| 6,743,201 | B1 | 6/2004 | Doenig et al. |
| 6,793,387 | B1 | 9/2004 | Neas et al. |
| 6,985,983 | B2 | 1/2006 | Pellegrino et al. |
| 7,134,573 | B2 | 11/2006 | Post et al. |
| 7,226,203 | B2 | 6/2007 | Rondeau et al. |
| 7,344,299 | B2 | 3/2008 | Sprinkle |
| 7,347,613 | B2 | 3/2008 | Ditzig et al. |
| 7,451,941 | B2 | 11/2008 | Jackson |
| 7,510,730 | B2 | 3/2009 | Lyons et al. |
| 7,534,970 | B2 | 5/2009 | Tump |
| 7,810,987 | B2 | 10/2010 | Hildreth |
| 7,860,727 | B2 | 12/2010 | Showalter et al. |
| 7,871,575 | B2 | 1/2011 | Baeuerle et al. |
| 7,972,734 | B2 | 7/2011 | Kuroda et al. |
| 7,991,560 | B2 | 8/2011 | Kaushikkar et al. |
| 8,008,082 | B2 | 8/2011 | Howland et al. |
| 8,041,437 | B2 | 10/2011 | Stellari et al. |
| 8,177,411 | B2 | 5/2012 | Borgstadt |
| 8,668,869 | B2 | 3/2014 | Hirayama et al. |
| 8,808,623 | B2 | 8/2014 | Linssen et al. |
| 9,138,693 | B2 | 9/2015 | Aouad |
| 2001/0006485 | A1 | 7/2001 | Kubiak et al. |
| 2002/0154567 | A1 | 10/2002 | Husher |
| 2003/0060925 | A1 | 3/2003 | Bartholomew et al. |
| 2003/0126195 | A1 | 7/2003 | Reynolds et al. |
| 2003/0198125 | A1* | 10/2003 | Linsen ................. B01F 13/1066 366/152.1 |
| 2003/0227819 | A1 | 12/2003 | Villwock et al. |
| 2004/0151062 | A1 | 8/2004 | Yao et al. |
| 2004/0157336 | A1 | 8/2004 | Petroff et al. |
| 2004/0261897 | A1* | 12/2004 | Carlson ..................... B65B 1/30 141/130 |
| 2005/0087545 | A1 | 4/2005 | Petrus et al. |
| 2005/0169099 | A1 | 8/2005 | Sprinkle |
| 2007/0025179 | A1 | 2/2007 | Hildreth |
| 2007/0078631 | A1 | 4/2007 | Ariyoshi et al. |
| 2007/0084520 | A1 | 4/2007 | Driessen et al. |
| 2007/0269894 | A1 | 11/2007 | Howland et al. |
| 2008/0190460 | A1 | 8/2008 | Berklund et al. |
| 2008/0279038 | A1 | 11/2008 | Bellafiore et al. |
| 2009/0022007 | A1 | 1/2009 | Massarotto |
| 2009/0092001 | A1* | 4/2009 | Hildreth ............ B01F 15/00285 366/132 |
| 2009/0246085 | A1 | 10/2009 | Watson et al. |
| 2009/0268548 | A1 | 10/2009 | Hartmann et al. |
| 2011/0040593 | A1 | 2/2011 | Depreter |
| 2011/0076159 | A1 | 3/2011 | Fulkerson et al. |
| 2011/0284090 | A1 | 11/2011 | Popa et al. |
| 2012/0041045 | A1 | 2/2012 | Harvey et al. |
| 2012/0147924 | A1 | 6/2012 | Hall |
| 2012/0241045 | A1 | 9/2012 | Aouad |
| 2012/0247613 | A1* | 10/2012 | Behbehani .............. G07F 13/08 141/98 |
| 2014/0016432 | A1 | 1/2014 | Lehtonen et al. |
| 2015/0314246 | A1 | 11/2015 | Lehtonen et al. |
| 2018/0080952 | A1 | 3/2018 | Lehtonen et al. |

FOREIGN PATENT DOCUMENTS

| | | |
|---|---|---|
| CN | 1410759 A | 4/2003 |
| CN | 1451470 A | 10/2003 |
| CN | 1571921 A | 1/2005 |
| CN | 101019009 A | 8/2007 |
| CN | 200995183 Y | 12/2007 |
| CN | 101152620 A | 4/2008 |
| CN | 101153815 A | 4/2008 |
| CN | 201373768 Y | 12/2009 |
| CN | 201493057 U | 6/2010 |
| CN | 201506693 U | 6/2010 |
| CN | 202237860 U | 5/2012 |
| CN | 202246198 U | 5/2012 |
| DE | 102004053921 A1 | 5/2006 |
| EP | 0289048 A2 | 11/1988 |
| EP | 0958118 A1 | 11/1999 |
| EP | 1559652 A1 | 8/2005 |
| EP | 2665997 A1 | 11/2013 |
| JP | S6388029 A | 4/1988 |
| JP | S63273014 A | 11/1988 |
| JP | S63274441 A | 11/1988 |
| JP | 2004279414 A | 10/2004 |
| JP | 2005344182 A | 12/2005 |
| JP | 2006102667 A | 4/2006 |
| JP | 2008521555 A | 6/2008 |
| JP | 2008537882 A | 10/2008 |
| WO | WO-9417370 A2 | 8/1994 |
| WO | WO-9617543 A1 | 6/1996 |
| WO | WO-03086604 A1 | 10/2003 |
| WO | WO-2010015925 A2 | 2/2010 |
| WO | WO-0244994 A9 | 9/2010 |
| WO | WO-2011162666 A1 | 12/2011 |
| WO | WO-2012098403 A1 | 7/2012 |
| WO | WO-2014015186 A1 | 1/2014 |

OTHER PUBLICATIONS

European search report and opinion dated Feb. 12, 2016 for EP Application No. 13820519.

Hicks, et al. Modification of an automated liquid-handling system for reagent-jet, nanoliter-level dispensing. Biotechniques. Apr. 2001;30(4):878-85.

International search report and written opinion dated Apr. 19, 2012 for PCT/GB2012/050114.

International search report and written opinion dated Jun. 3, 2016 for PCT/US2016/016633.

International search report and written opinion dated Jul. 1, 2016 for PCT/IB2016/000372.

International search report and written opinion dated Oct. 21, 2013 for PCT/US2013/051157.

International search report with written opinion dated Jun. 3, 2016 for PCT/IB2016/000372.

Office Action dated Feb. 3, 2017 for U.S. Appl. No. 13/980,855.

Office action dated May 5, 2016 for U.S. Appl. No. 13/980,855.

Office action dated Aug. 5, 2014 for CN Application No. 201280014018.6. .

Office action dated Aug. 16, 2019 for IN Application No. No/6807/DELNP/2013.

Office Action dated Oct. 4, 2017 for U.S. Appl. No. 14/415,567.

U.S. Appl. No. 13/980,855, filed Sep. 30, 2013.

U.S. Appl. No. 14/415,567, filed Jan. 16, 2015.

U.S. Appl. No. 13/980,855 Office Action dated Dec. 20, 2017.

U.S. Appl. No. 14/415,567 Non-Final Office Action dated Jan. 8, 2019.

(56) References Cited

OTHER PUBLICATIONS

U.S. Appl. No. 13/980,855 Notice of Allowance dated Dec. 26, 2018.
U.S. Appl. No. 15/667,961 Office Action dated Mar. 7, 2019. .
UK search report dated May 31, 2011 for GB Application No. 1101075.8.

* cited by examiner

AUTOMATED SOLUTION DISPENSER

CROSS REFERENCE

This application is a continuation application of U.S. patent application Ser. No. 13/980,855, filed Sep. 30, 2013 and now issued as U.S. Pat. No. 10,286,371 which is a National Stage Entry of International Patent Application PCT/GB2012/050114, filed Jan. 19, 2012, which claims the benefit of U.K. Provisional Patent Application GB1101075.8, filed Jan. 21, 2011, each of which is entirely incorporated herein by reference.

FIELD OF THE INVENTION

The present invention relates to an automated solution dispenser for dispensing a solution having a defined list of characteristics.

BACKGROUND TO THE INVENTION

One of the most common activities in many chemical fields is the preparation of liquid solutions. This happens for example in liquid handling (wet) laboratories in both industry and academia. Outside of industry, most of the preparation is done manually. In some cases the preparation is very delicate, and with the preparation process a variety of parameters such as temperature and pH have to be controlled—sometimes additionally degasification (removal of dissolved gases from liquids) is necessary.

Controlling the amounts of substances going into a solution is critical, as otherwise the solution is essentially random. This becomes particularly important in sciences, where there are few cues (visual or otherwise) to the contents of a solution. Furthermore, monitoring characteristics such as the pH value of a solution is often required for scientific experiments where this information is essential, but it also has significant implications on various other applications. Similarly, monitoring the temperature is valuable in science because pH and temperature are linked—changes in temperature can mask a difference in pH. To this end, it is impossible to control pH to a very accurate degree without knowing the temperature of a solution.

Cleaning the environment in which the solution is prepared is vital as cross contamination is unacceptable in the scientific sphere, and is hardly desired anywhere else. On the other hand, reducing time use is also important in any process automation, and manual cleaning and/or expendable component replacement would negate much of this benefit.

Controlling the temperature of the solution is also important, as some solutions have to be prepared at a certain temperature. While there are ways around this (input substances are at specific temperatures), ideally there should be heating and cooling elements embedded in to the chamber, to regulate the temperature of the chamber.

Controlling the pH of the solution is equally important, as correcting the pH is not particularly difficult (add a certain amount of acid or base). For many scientific solutions this is essential, as they will not be at the correct pH after the components are mixed.

However, to date, automated solutions for use in laboratories have not been satisfactory. As such, we have appreciated the need for an improved automated solution mixer and dispenser.

SUMMARY OF THE INVENTION

The present invention provides an automated solution dispenser for dispensing a solution having a defined list of characteristics, the characteristics comprising one or more characteristics selected from the group comprising pH, temperature, chemical composition, the dispenser comprising: a mixing chamber; at least one controllable inlet port to the chamber for controllably receiving components to be mixed into a solution; at least one input sensor for determining a quantitative input of the components to be mixed into the solution; agitation means for agitating the received components; at least one solution sensor for sensing one or more characteristics of the solution; an outlet port coupled to the mixing chamber; a controllable outlet port valve for controlling the flow of solution through the output port; and a controller coupled to the at least one controllable inlet port, the at least one input sensor, the agitator, the at least one solution sensor, and the outlet port valve, and the controller being configured to measure the received components, mix the received components into a solution and dispense the solution, wherein the at least one controllable inlet port comprises a controllable solids port for controllably supplying solid components to the mixing chamber from one or more solid sources, the controllable solids port comprising a solids dispensing system engageable with a solids dosing mechanism for controllably dispensing a dosed amount of a solid from a solid source.

By providing a controllable solids port, this enables the automation of the solution creation, in that all manner of solid typed may be handled without user intervention. For example, Crystalline form, Loose powder or Clumpy powder.

Preferably, the solids dispensing system comprises a dosing mechanism driver moveable in and out of engagement with the solids dosing mechanism, and wherein, when engaged, the solids dosing mechanism is driveable to dispense a dosed amount of the solid by the dosing mechanism driver.

In embodiments, the solution dispensing system comprises a moveable tube extending from an inlet of the mixing chamber towards the solid dosing mechanism, the tube having an inlet for receiving solids dispensed from a solid source, an outlet coupled to the inlet of the mixing chamber and being configured to allow solids received from the solid source to pass therethrough. Preferably, the moveable tube is moveable in and out of engagement with the solids dosing mechanism, and wherein, when engaged, the tube forms a path between the solid dispensing mechanism and the mixing chamber through which solids may pass.

In embodiments with the moveable tube, the tube is shaped to prevent dispensed solids from attaching to an inner surface of the tube. Furthermore, a wall of the tube may be electrostatically charged or coated with a non-stick material to repel dispensed solids.

In some embodiments, the solids dosing mechanism comprises: an inlet for receiving a solid; a dosing screw rotatable about its longitudinal axis for carrying the received solid; a rotatable base coupled to the dosing screw, the rotatable base being rotatable in cooperation with the dosing screw; and an outlet for receiving the carried solids from the dosing screw, wherein, when rotated about its longitudinal axis, the dosing screw carries a received solid from the inlet to the outlet, and wherein the dosing screw and rotatable base are movable along the longitudinal axis of the dosing screw between an open position in which the outlet is open, and a closed position in which the outlet is closed.

Preferably, the dosing screw and rotatable base are coupled to a gear gate for driving the dosing screw and rotatable base, and wherein the gear gate is drivable by the dosing mechanism driver.

In embodiments, the dosing screw and rotatable base are biased in the closed position. This enables solid sources comprising the dosing mechanism to be removed from the system without solids contained within a solid source spilling out.

In some embodiments, the controller is configured to determine a weight of a dosed amount of solid dispensed from a solid source dependent on a time and rate at which the solid dosing mechanism is driven.

In further embodiments, the solid source is a container containing a solid to be dispensed, and the solid dosing mechanism is coupleable to the container. In some of the further embodiments, the automated solution dispenser comprises a plurality of containers, each container being coupleable to a solid dosing mechanism.

Preferably, the plurality of containers are controllably moveable between a dispensing position in which a container is aligned with the controllable inlet port to enable dispensing of a contained solid, and a storage position in which the container is not aligned with the controllable inlet port.

More preferably, the plurality of containers are disposed on a turntable having an axis of rotation such that the containers are movable between the dispensing and storage positions.

In some embodiments, the input sensor comprises a weighing device configured to determine a loss in weight of the container upon dispensing of a solid into the mixing chamber from the container, and wherein the controller is configured to controllably supply the solid to the mixing chamber until a target weight of the solid is reached based on the determined loss in weight of the container.

In other embodiments, the input sensor comprises a solids weighing device for receiving, weighing and dispensing a dispensed solid from the solids dosing mechanism into the mixing chamber.

In embodiments comprising solids weighing device, the solids weighing device comprises: a moveable receptacle for receiving the dispensed solid; a weighing device coupled to the moveable receptacle for weighing the dispensed solid; and a dispensing mechanism for dispensing the weighed solid into the mixing chamber. Preferably, the weighing device comprises a load cell or a force compensated electromagnet.

In some of these embodiments, the dispensing mechanism is configured to move the receptacle to a receiving position when receiving a solid to be weighed from the solid dosing mechanism, and configured to move the receptacle to a dispense position when the weighed solid is to be dispensed into the mixing chamber.

In further embodiments, the input sensor comprises a weighing device configured to determine a gain in weight of the mixing chamber upon receipt of a solid into the mixing chamber from a solid source, and wherein the controller is configured to controllably supply the solid to the mixing chamber until a target weight of the solid is reached based on the determined gain in weight of the mixing chamber.

In embodiments, the input sensor comprises a solution sensor for sensing one or more characteristics of the solution and wherein the controller is configured to controllably supply the solid to the mixing chamber until a target characteristic of the solution is detected.

In further embodiments, the controller is further configured to control the dispenser to implement a cleaning cycle in which at least one inlet port is controlled to input a cleaning fluid into the mixing chamber, and the controllable outlet valve is controlled to dispense the cleaning fluid.

In embodiments comprising the cleaning cycle, the automated solution dispenser according further comprises a cleanliness measuring sensor coupled to the controller and wherein said controller is configured to measure cleanliness and do one or more further cleaning cycles in response to the sensed cleanliness of the cleaning fluid after a cleaning cycle. Preferably, the cleanliness measuring sensor comprises a conductivity sensor or turbidity sensor.

In one embodiment, at least one input port is coupled to one or more cleaning nozzles arranged to spray received cleaning fluid inside the chamber. Alternatively, at least one input port is coupled to a spray ball comprising a plurality of nozzles arranged to spray received cleaning fluid inside the chamber. Alternatively, the mixing chamber comprises a plurality of cleaning nozzles disposed in a wall of the mixing chamber, the nozzles being coupled to at least one input port and being arranged to spray received cleaning fluid inside the chamber.

In some embodiments, the at least one input is coupled to a pump for supplying cleaning fluid under pressure. Preferably, the at least one input is coupled to a detergent source for dispensing detergent into the cleaning fluid. More preferably, the detergent source comprises an injection pump.

In these embodiments, the cleaning cycle cleans a flowable path from the inlet port of the mixing chamber through to an output of the outlet port.

Furthermore in these embodiments, the automated solution dispenser comprises a controllable drying means coupled to the controller, and wherein the controller controls the controllable drying means to implement a drying cycle to dry the mixing chamber and/or inlet port. Preferably, the controllable drying means comprises a fan or a source of substantially dry air.

The present invention also provides an automated solution dispenser for dispensing a solution having a defined list of characteristics, the characteristics comprising one or more characteristics selected from the group comprising pH, temperature, chemical composition, the dispenser comprising: a mixing chamber; at least one controllable inlet port to the chamber for controllably receiving components to be mixed into a solution; at least one input sensor for determining a quantitative input of the components to be mixed into the solution; agitation means for agitating the received components; at least one solution sensor for sensing one or more characteristics of the solution; a cleanliness measuring sensor; an outlet port coupled to the mixing chamber; a controllable outlet port valve for controlling the flow of solution through the output port; and a controller coupled to the at least one controllable inlet port, the at least one input sensor, the agitator, the at least one solution sensor, the cleanliness measuring sensor and the outlet port valve, and the controller being configured to measure the received components, mix the received components into a solution and dispense the solution, wherein the controller is further configured to control the dispenser to implement a cleaning cycle in which at least one inlet port is controlled to input a cleaning fluid into the mixing chamber, and the controllable outlet valve is controlled to dispense the cleaning fluid, and wherein the controller is configured to measure cleanliness and do one or more further cleaning cycles in response to the sensed cleanliness of the cleaning fluid after a cleaning cycle.

By implementing a cleaning cycle, the automated solution dispenser advantageously enables automated batch processing of solutions, as no user intervention is required between different solutions being made. As such, there is no cross-contamination between the solutions being created.

The cleanliness measuring sensor enables the automated cleaning cycle to determine whether or not the cleaning cycle just performed has been successful or not. If not, the cycle is repeated until the cleanliness measurement sensor indicates that the cleaning solution is clean enough to indicate that the automated solution dispenser is clean.

Preferably, the cleanliness measuring sensor comprises a conductivity sensor or turbidity sensor.

In embodiments of the automated solution dispenser, at least one input port is coupled to one or more cleaning nozzles arranged to spray received cleaning fluid inside the chamber. In alternative embodiments of the automated solution dispenser, at least one input port is coupled to a spray ball comprising a plurality of nozzles arranged to spray received cleaning fluid inside the chamber. In further alternative embodiments, of the automated solution dispenser, the mixing chamber comprises a plurality of cleaning nozzles disposed in a wall of the mixing chamber, the nozzles being coupled to at least one input port and being arranged to spray received cleaning fluid inside the chamber.

In embodiments, the at least one input is coupled to a pump for supplying cleaning fluid.

In some embodiments, the at least one input is coupled to a detergent source for dispensing detergent into the cleaning fluid. Preferably, the detergent source comprises an injection pump.

In embodiments, the cleaning cycle cleans a flowable path from the inlet port of the mixing chamber through to an output of the outlet port. As such, there is no risk of cross-contamination between solution producing cycles, since each part of the system involved in creating the solution is cleaned.

In some embodiments, the automated solution dispenser comprises a controllable drying means coupled to the controller, and wherein the controller controls the controllable drying means to implement a drying cycle to dry the mixing chamber and/or inlet port. Preferably, the controllable drying means comprises a fan or a source of substantially dry air.

By providing a drying cycle, this prevents droplets of cleaning fluid left over from the cleaning cycle(s) (or any residual humidity) from cross-contaminating with, or otherwise affecting, the solution made after the cleaning cycle.

The present invention also provides an automated solution dispenser for dispensing a solution having a defined list of characteristics, the characteristics comprising one or more characteristics selected from the group comprising pH, temperature, chemical composition, the dispenser comprising: a mixing chamber; at least one controllable inlet port to the chamber for controllably receiving components to be mixed into a solution; at least one input sensor for determining a quantitative input of the components to be mixed into the solution; agitation means for agitating the received components; at least one solution sensor for sensing one or more characteristics of the solution; an outlet port coupled to the mixing chamber; a controllable outlet port valve for controlling the flow of solution through the output port; and a controller coupled to the at least one controllable inlet port, the at least one input sensor, the agitator, the at least one solution sensor, and the outlet port valve, and the controller being configured to measure the received components, mix the received components into a solution and dispense the solution, wherein the controller is further configured to control the dispenser to implement a cleaning cycle in which at least one inlet port is controlled to input a cleaning fluid into the mixing chamber, and the controllable outlet valve is controlled to dispense the cleaning fluid, wherein the at least one controllable inlet port comprises a controllable liquid inlet port for controllably supplying liquid to the mixing chamber from one or more liquid sources, and wherein the at least one controllable inlet port comprises a controllable solids port for controllably supplying solid components to the mixing chamber from one or more solid sources.

In some embodiments, the at least one controllable inlet port comprises a controllable liquid inlet port for controllably supplying liquid to the mixing chamber from one or more liquid sources.

In this embodiment, the liquid source of the automated solution dispenser comprises a continuous supply, a reservoir internal to the solution dispenser or a reservoir external to the solution dispenser.

In embodiments, controllable liquid inlet port comprises one or more pumps coupled to the controller, and wherein the controller is configured to control the one or more pumps to dispense a desired amount of liquid from the one or more liquid sources. Preferably, the pump comprises a peristaltic pump, a syringe pump, a piston pump, a reciprocating pump, a diaphragm pump, a screw pump, a rotating lobe pump, a gear pump or a plunger pump.

In some embodiments, the outlet port of any of the automated solution dispensers described may be coupled to a controllable directing mechanism for directing a dispensed solution to a desired station, and wherein the controller is configured to control the directing mechanism to dispense a solution to a desired station dependent on a program mode of the automated solution dispenser.

In such an embodiment, the station comprises a drain, a bottle handling station, a pH sensor storage liquid recycle station, a filtering and bottling station, a degassing and bottling station or an analysing and bottling station.

In any of the embodiments described above, the solution sensor comprises a temperature sensor, and wherein the controller is configured to control heating and/or cooling means to control the temperature of the solution based on a target temperature.

In any of the embodiments described above, the automated solution dispenser further comprising memory storage means, and wherein the controller is configured to measure and store a plurality of operating parameters of the automated solution dispenser during operation and store the parameters in the memory storage means.

In such an embodiment, preferably, the operating parameters comprise one or more of operating time, target temperature, target pH, and target composition of solution. Preferably, the controller is configured to output one or more of the operating parameters. Preferably, the controller is configured to output the one or more operating parameters to a label for affixing to a container containing a solution dispensed by the automated solution dispenser.

In any of the embodiments described above, the controller is configured to implement a storage cycle when the automated solution dispenser is not in use, the storage cycle comprising: controlling an inlet port to input a storage solution into the mixing chamber, and wherein the storage solution is selected to preserve a solution sensor.

In any of the embodiments described above, the controller is configured to implement a calibration cycle to calibrate a solution sensor, the calibration cycle comprising: controlling an inlet port to input a solution having a known characteristic into the mixing chamber; reading an output of a solution sensor; comparing the reading with the known characteristic; and adjusting the solution sensor based on a difference between the read output and the known characteristic.

In any of the embodiments, the automated solution dispenser may comprise a filter in fluid communication with the outlet port for filtering a received solution disposed through the outlet port.

In any of the embodiments, the automated solution dispenser may comprise a water purifier, providing deionised and filtered water to be used in the automated solution dispenser—in direct fluid communication or channelled through a pump—with at least one inlet port of the central mixing chamber.

LIST OF FIGURES

Figure 2:
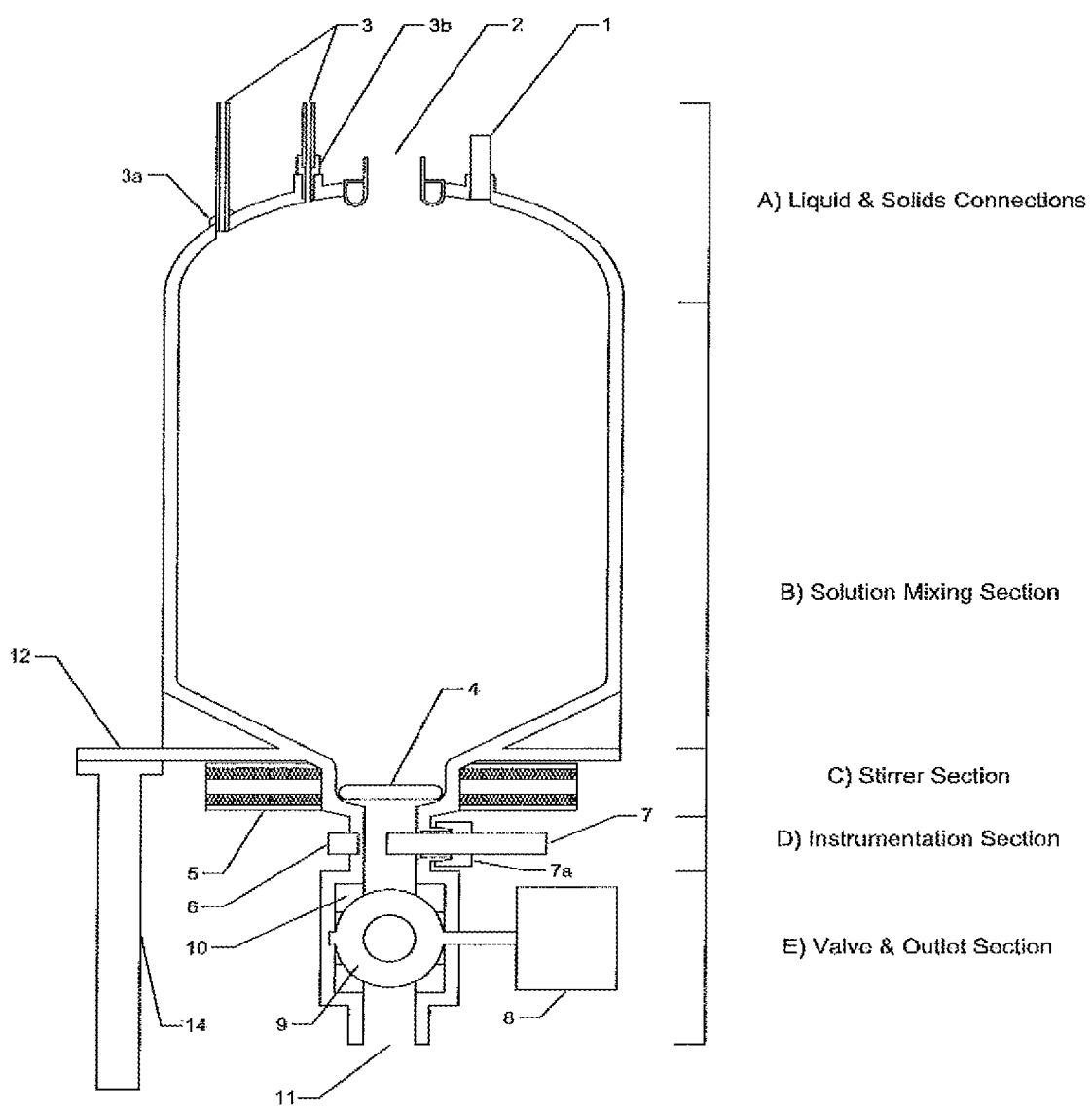
Figure 3:
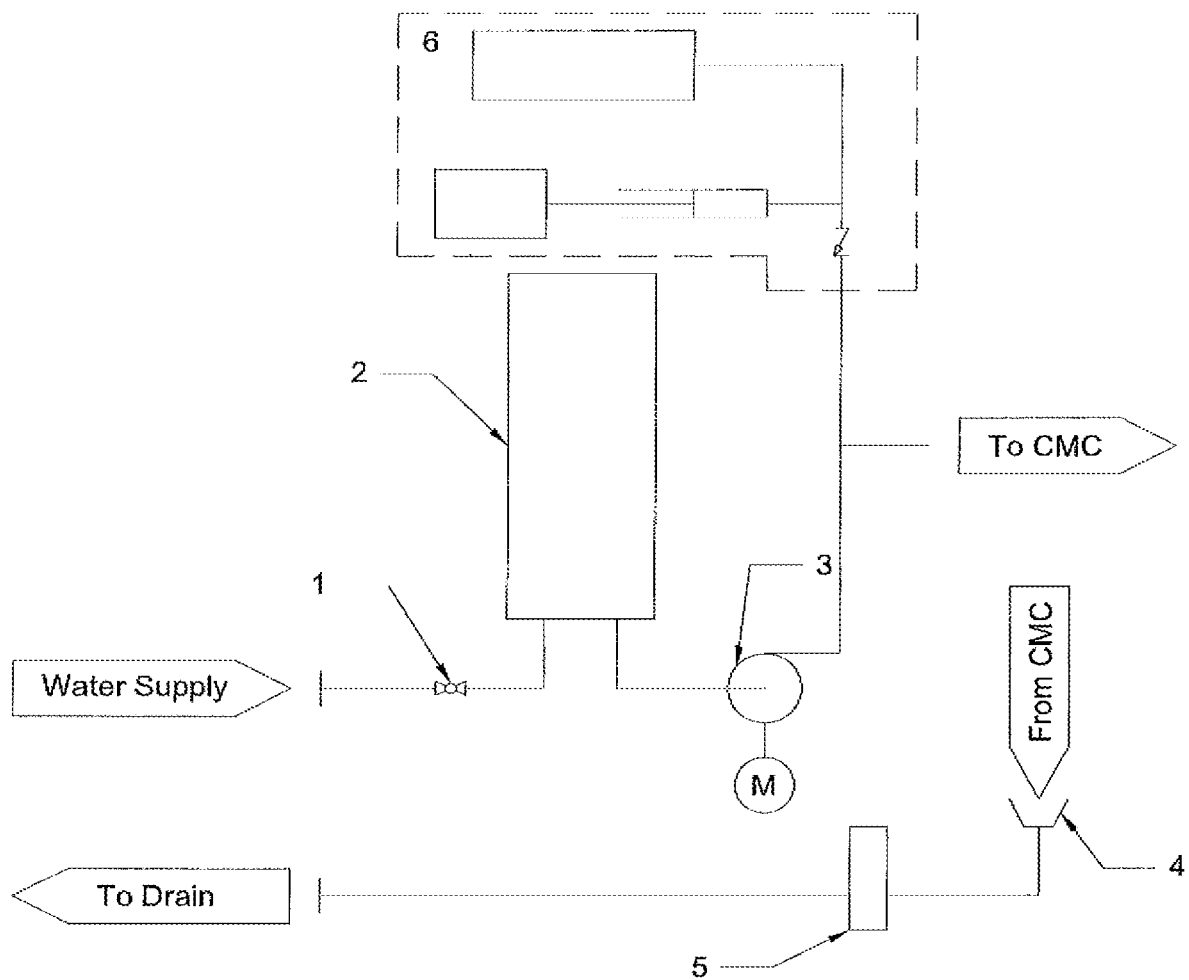
Figure 4:
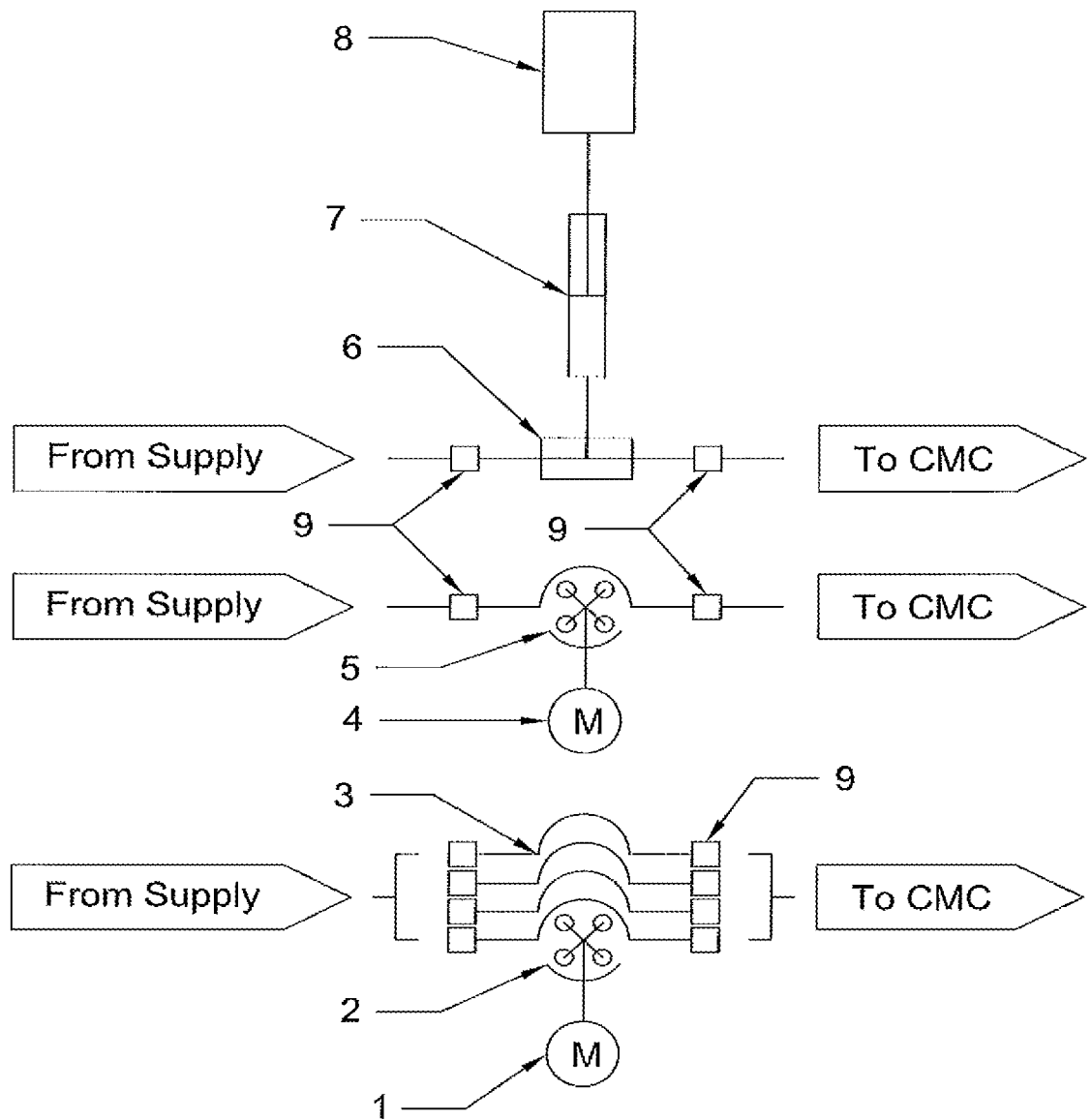
Figure 5:
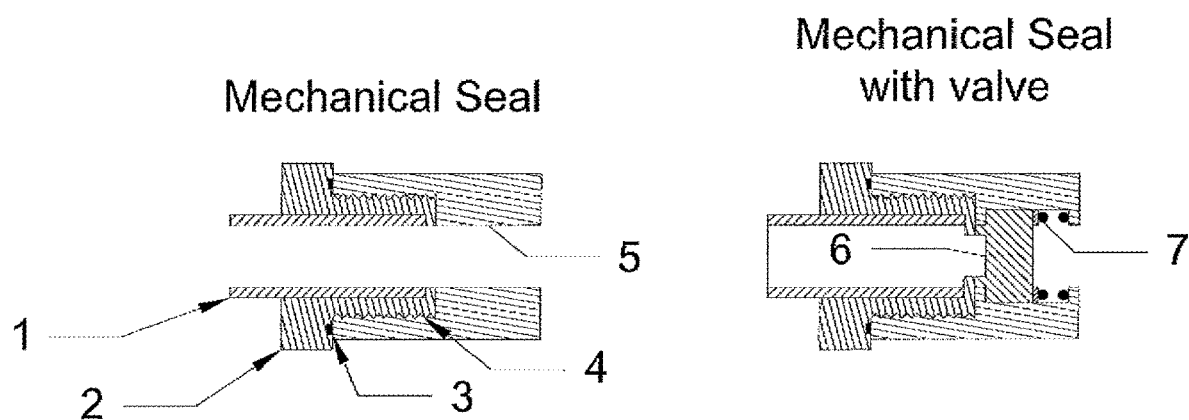
Figure 6:
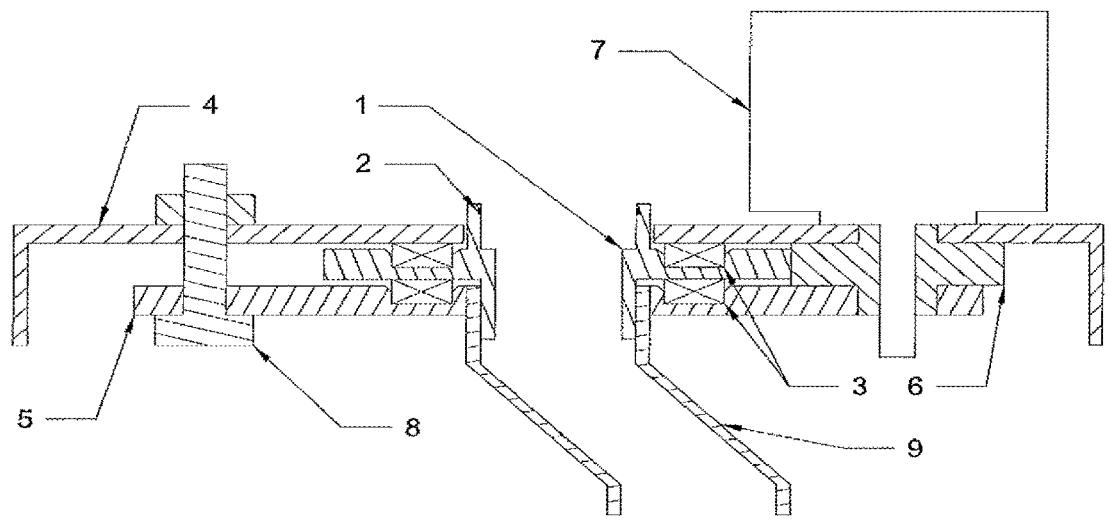
Figure 7:
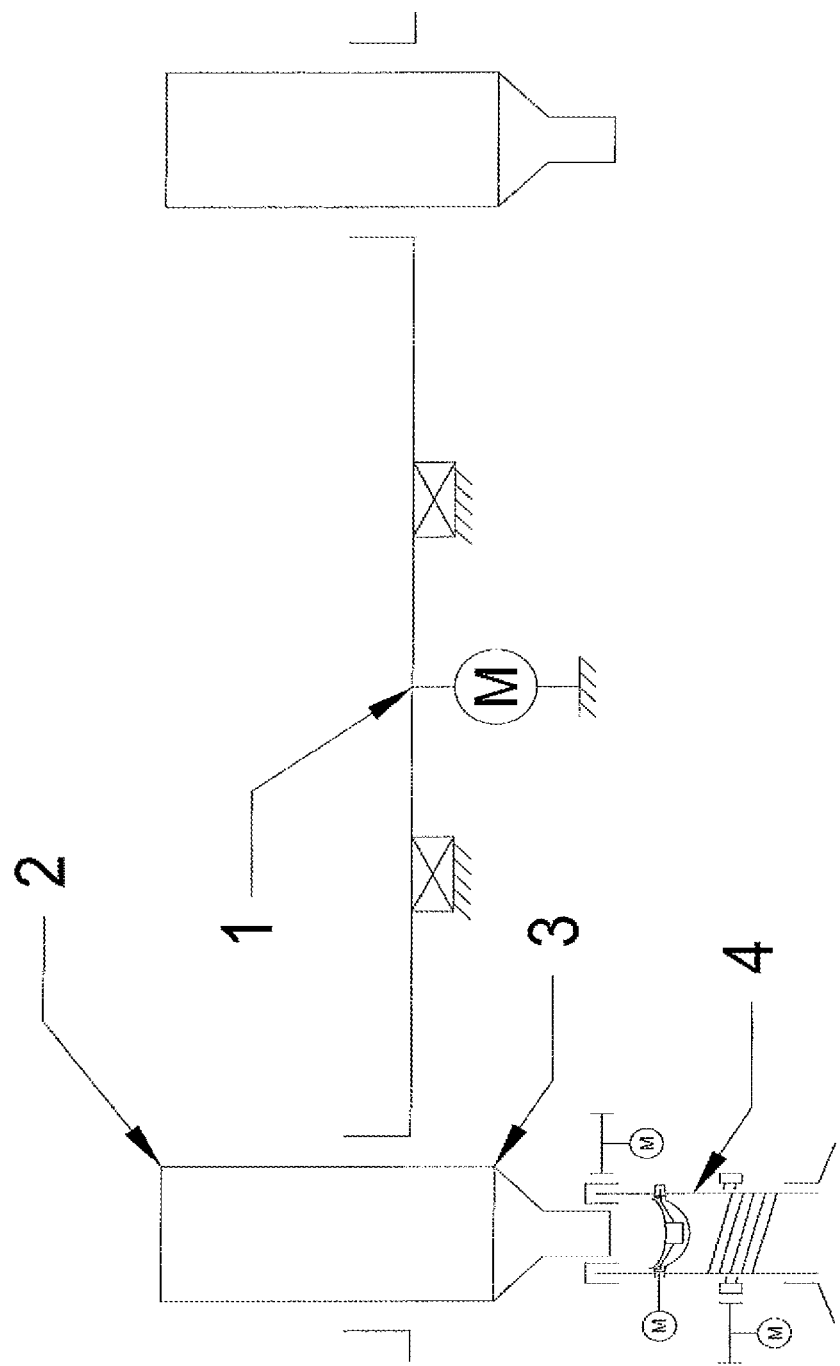
Figure 8:
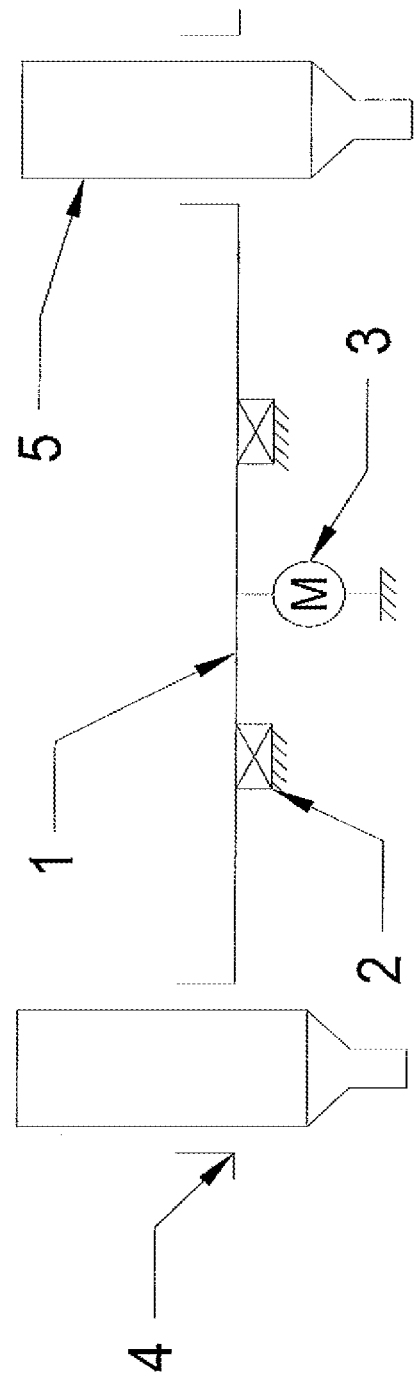
Figure 9:
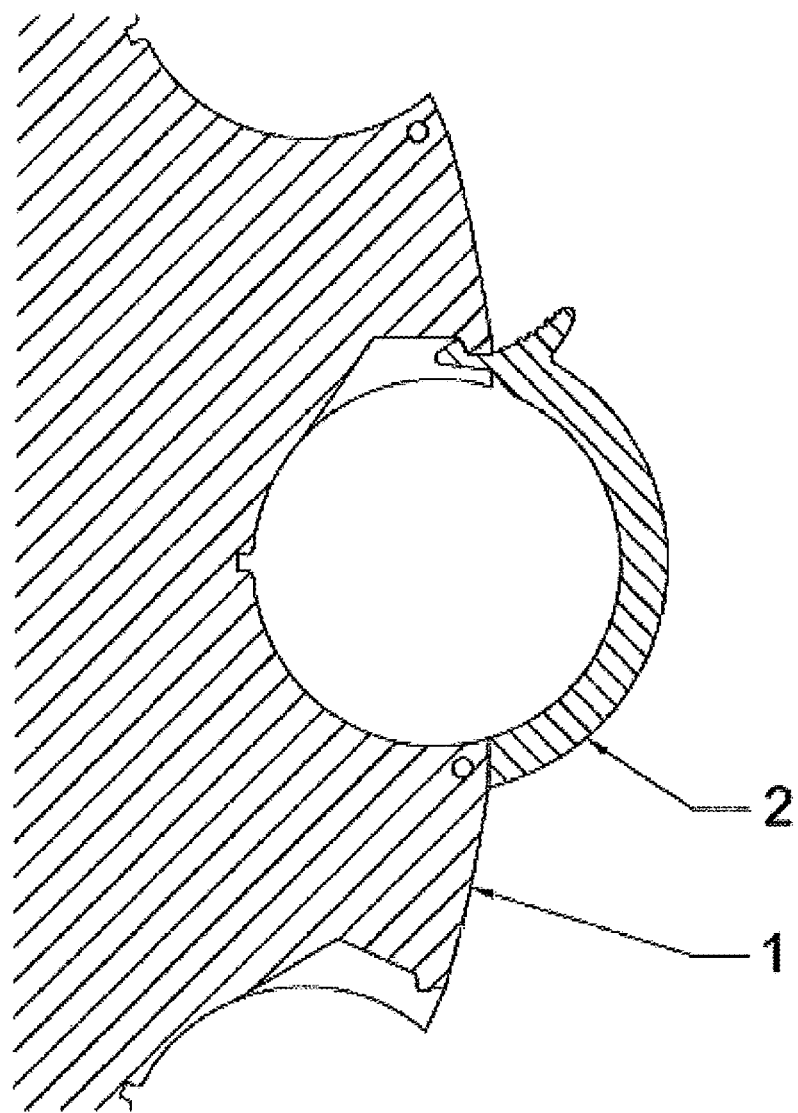
Figure 10:
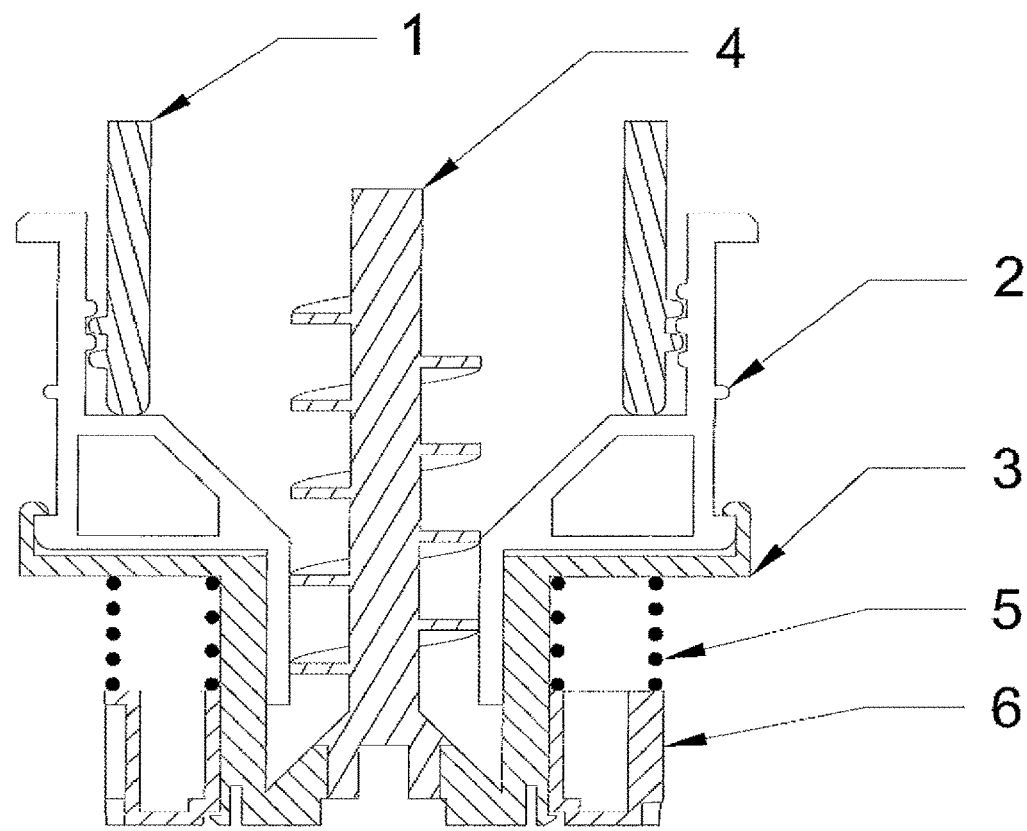
Figure 12:
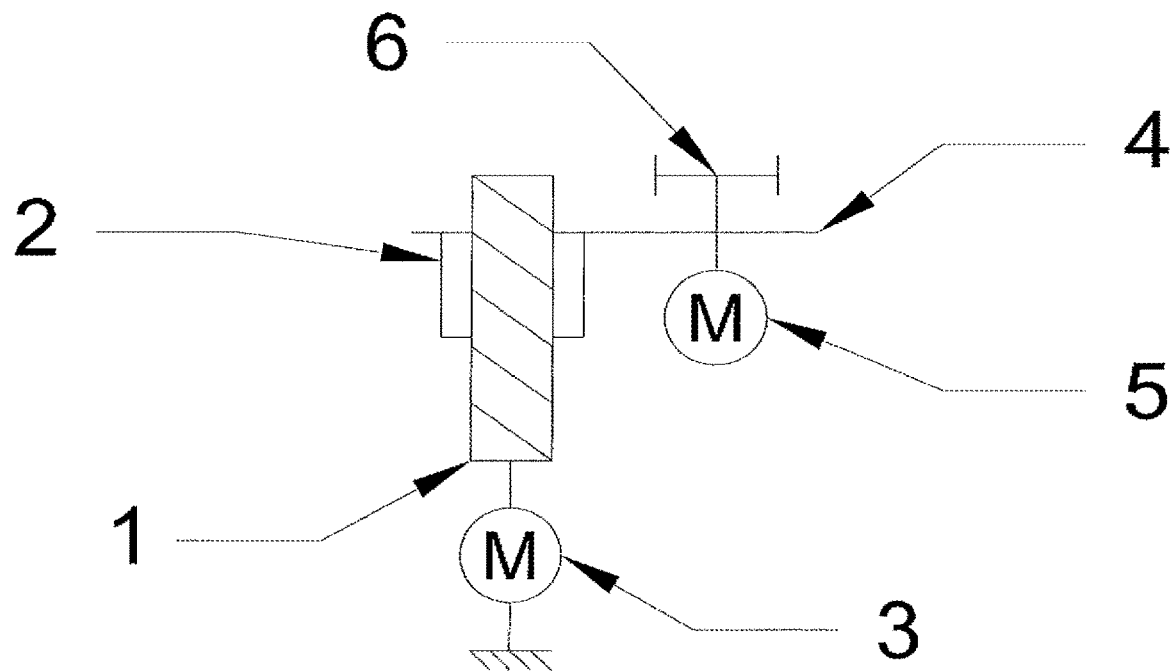
Figure 11:
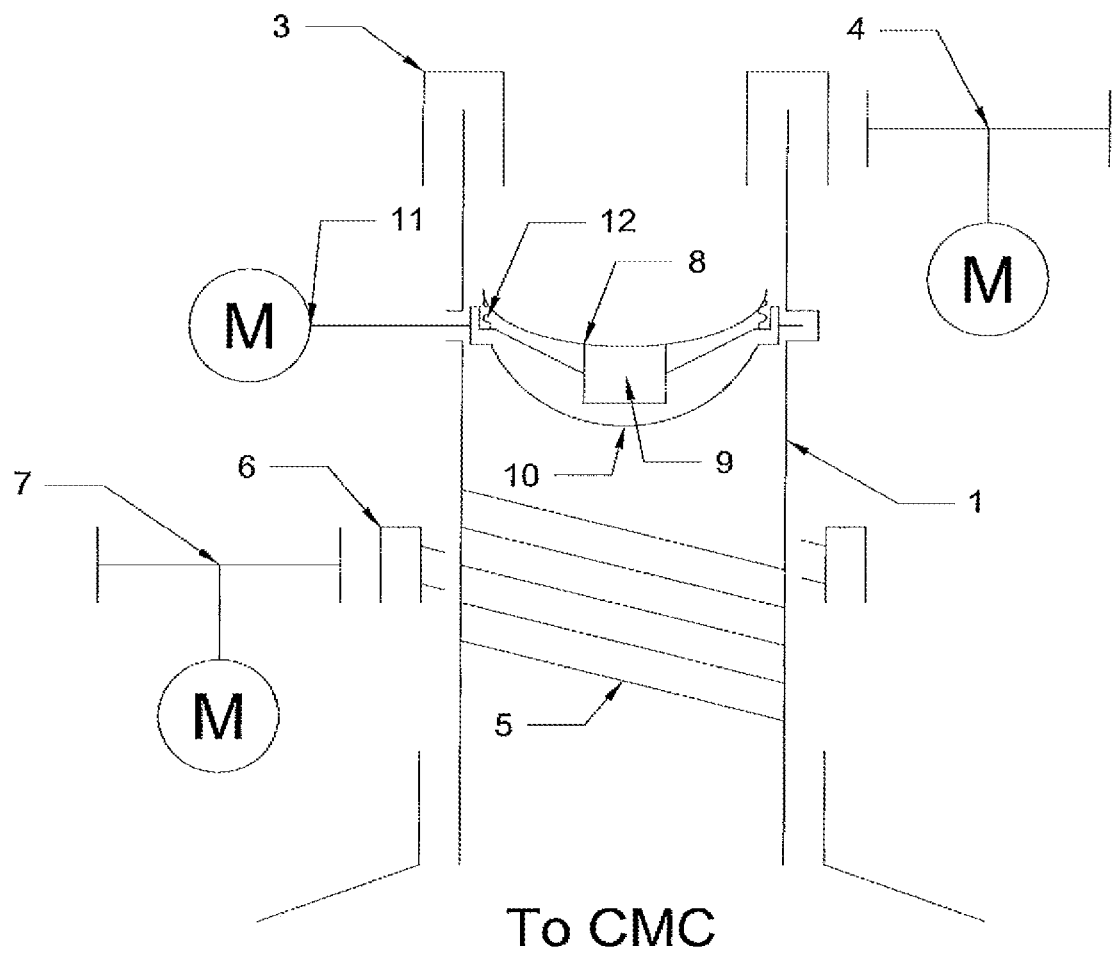
Figure 13:
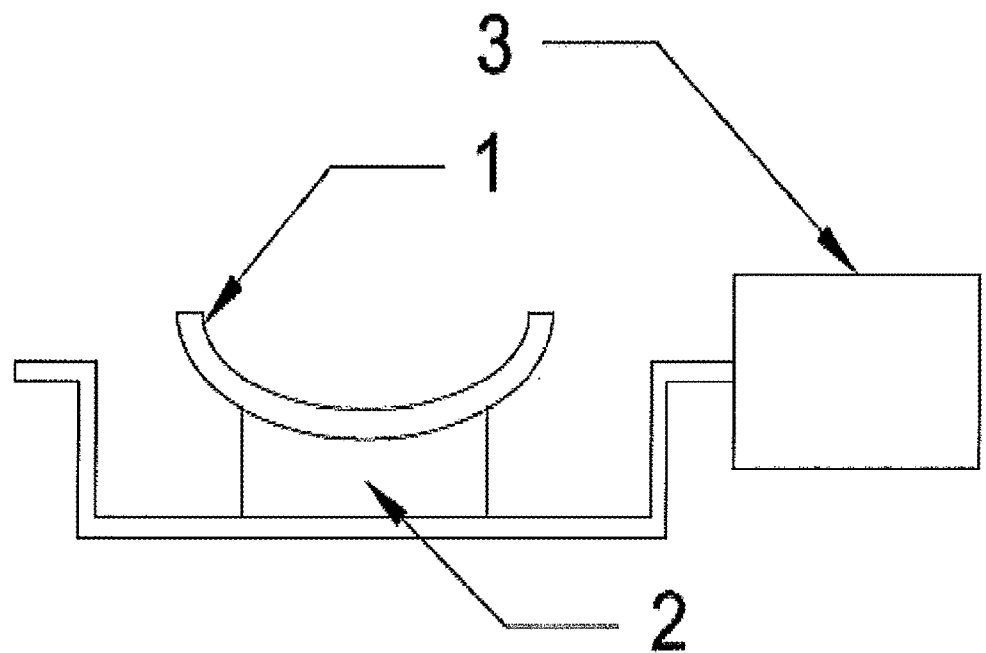
Figure 13:
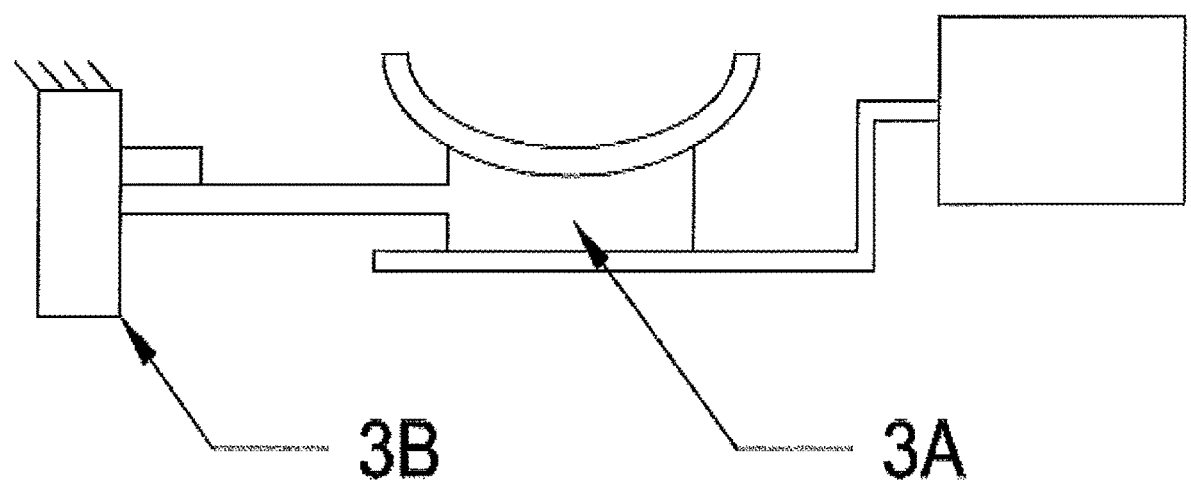
Figure 14:
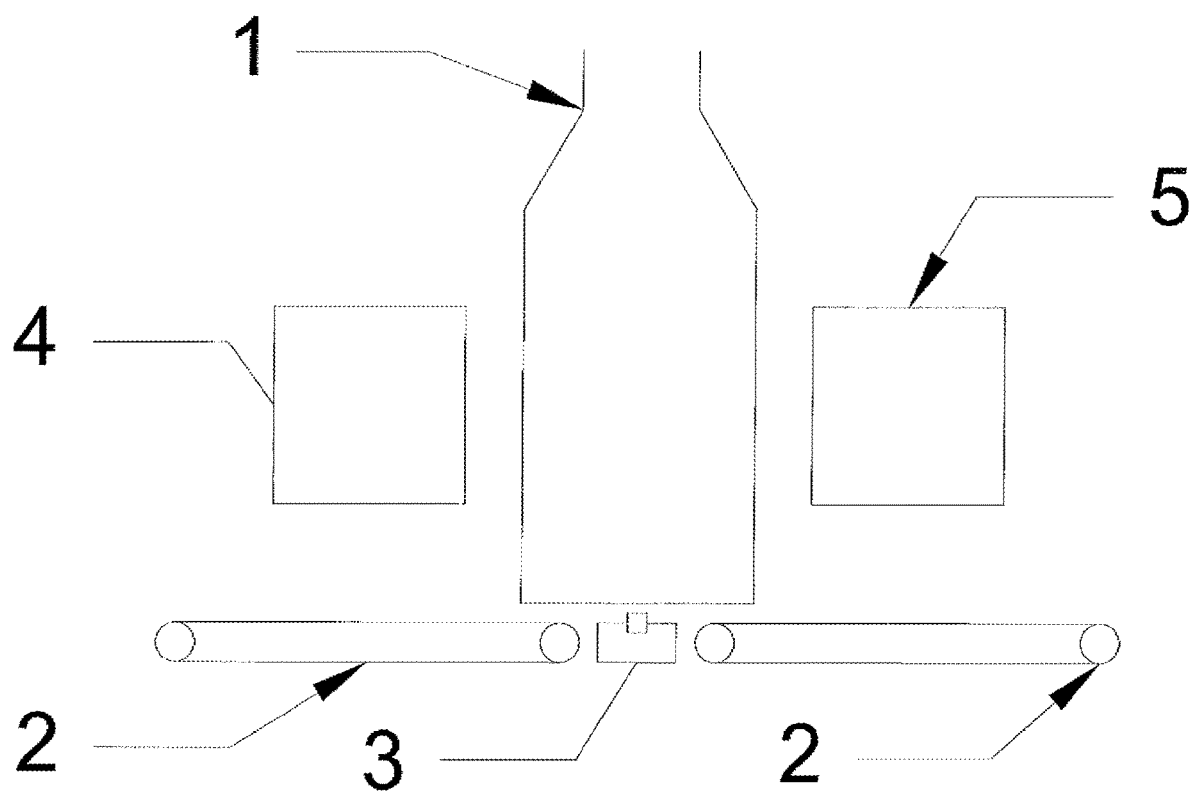

The present invention will now be described, by way of example only, and with reference to the drawings, in which:

FIG. 1 shows an overview of an automated solution dispenser according to the present invention;
FIG. 2 shows the central mixing chamber;
FIG. 3 shows the flush and verification system;
FIG. 4 shows the liquid handling system;
FIG. 5 shows mechanical seals;
FIG. 6 shows a pivot pipe;
FIG. 7 shows the solids handling system;
FIG. 8 shows a turn table for the solids handling system;
FIG. 9 shows the turn table of FIG. 8 in more detail;
FIG. 10 shows a dosing system;
FIG. 11 shows a solids platform weight scale and dosing driver
FIG. 12 shows an alternative solids platform and dosing driver;
FIG. 13 shows an alternative weight scale;
FIG. 14 shows a bottle handling system.

DETAILED DESCRIPTION OF THE PREFERRED EMBODIMENTS

In brief, the automated solution dispenser prepares liquid solutions from a combination of solids and liquids, using a range of sensors to verify the correctness of the prepared solution. A number of sub-systems comprise the automated solution dispenser, which are grouped as core systems and auxiliary systems.

The core systems comprise the following:
1. Central Mixing Chamber (CMC). The CMC collects and holds the dispensed liquids and solids, mixes them and adjusts the pH value of the solution with help of the Liquid Handling System (LHS) and Solid Handling System (SHS), and the temperature of the solution according to the user's specification. The resulting solution is then discharged into the Pivot Pipe System (PPS). Next, the CMC is cleaned in preparation for the next solution. It includes the following sub-systems:
    a. Mixing chamber (e.g. by means of an cylindrical container)
    b. pH sensor (e.g. by means of a pH sensor)
    c. Temperature sensor and control (e.g. by means of a controlled immersion heater)
    d. Stirrer/Agitator (e.g. by means of an magnetic stirrer bar contained in the CMC which is driven by an external rotating magnetic field)
    e. Liquid level sensor (e.g. by means of an ultrasound level sensor)
    f. Turbidity sensor (e.g. by means of a turbidity sensor)
    g. Controlled outlet (e.g. by means of a ball valve)
2. Flush and Verification System (FVS). The FVS is an integrated system that ensures that the CMC is clean before each use to prevent any cross contamination between sequentially prepared liquid solutions. It includes the following sub-systems:
    a. Cleaning mechanism (e.g. by means of a spray device releasing heated water)
    b. Cleanliness sensor (e.g. by means of monitoring the conductivity of the CMC discharge)
3. Liquid Handling System (LHS). The LHS releases controlled amounts of liquids into the CMC. It includes the following sub-systems:
    a. Delivery mechanism (e.g. by means of a peristaltic pump)
    b. Measuring mechanism (e.g. by means of a peristaltic pump)
4. Control System (CS). The CS is the electronics and software logic that controls all the core and auxiliary systems within the device.
5. Pivot Pipe System (PPS). The PPS directs the CMC discharge to the correct station (e.g. filtering/bottling position or drain position).

The auxiliary systems include, but are not limited to, the following:
6. Solid Handling System (SHS). It includes the following sub-systems:
    a. Delivery mechanism (e.g. by means of an enclosed dosing screw)
    b. Measuring mechanism (e.g. by means of a load cell)
7. Bottle Handling System (BHS). The BHS supplies an empty bottle (or any other suitable container) to the CMC discharge point, which is then filled with the solution discharged from the CMC. It also ensures that the bottle is correctly positioned. In some cases the BHS will feed directly into another machine/equipment.
8. Filtering System. The Filtering System filters the solution before it is bottled.
9. Bottle Marking/Label (BM)—The BM marks/labels the bottle containing the prepared solution with a solution information label (e.g. by means of a printed sticky label or directly printing the information onto the bottle).
10. Water Purifier. The Water Purifier includes deionisation and/or filtration of feed/input water to obtain a certain water quality, e.g. 'ultrapure' or Type 1 water as for example laid out by ISO 3696. The addition of a water purification system is advantageous in an automated solution preparation system, since that purified water is predominantly used to either prepare liquid solutions or clean materials and components used in the preparation process.

Central Mixing Chamber

The purpose of Central Mixing Chamber (CMC) is to mix user specified liquid solutions from various forms of solids and liquids, without direct human input. The CMC has a number of aspects:
A) Liquid and solids inlets
B) Mixing area and Heating
C) Stirrer
D) Instrumentation
E) Valve & outlet Referring to FIG. 2, the liquid and solid inlets are located in the top section of the CMC (2-A), where each liquid has its own inlet (2-3), while solids have a common inlet port (2-2). The liquid tubes use a nozzle (needles) to control the size of liquid drops that enter the CMC at a time, increasing the accuracy of the liquid dosing. The liquid inlet holds the liquid tube in place and when necessary will have a sealed connection, either with a sealant (2-3A) or a mechanical seal (2-3B).

In some embodiments, the mechanical seal can be in the form of a threaded connection with o-ring seals, or as a compression fitting. The liquid inlet can be either let directly into the CMC or through a nozzle.

The cleaning nozzle ring (lower section of 2-2) is also located in the top section of the CMC, and surrounds the common solid inlet. The cleaning nozzle provides the cleaning and flushing liquid to clean the CMC between each solution creation. All exposed internal surfaces of the CMC are cleaned to prevent cross contamination between sequential preparation of solutions. A nozzle example is a hollow ring that has spray nozzles on the inside (directed towards the solid inlet) and on the outside (directed towards the exposed internal CMC surface) through which pressurized hot water is delivered to all the CMC surfaces.

In some embodiments, the solid inlet and cleaning nozzle are instead separated, and use a spray ball nozzle (static or dynamic). The cleaning nozzle can also be incorporated into the CMC wall, so that the nozzle centre becomes the solid's inlet and could also contain the liquid inlets.

The bottom of the CMC is comprised with the Valve & Outlet section (lowest point) (2-E), with the instrumentation (sensor) section (2-D) above it, and the stirrer/agitator section (2-C) on top of it (It is possible to swap the two sections, 2-C and 2-D around). The Valve &Outlet section is comprised of the valve (2-9), which has an actuator (2-8), which could be a stepper motor or any other form of actuator. This actuator opens and closes the valve. The depicted implementation uses a ball valve design that is incorporated into the CMC body, other designs utilise a plug design. The valve (2-9) when in the closed position, will hold the liquid solution within the CMC. When the valve is open the liquid will be directed through the outlet (2-11) either to the drain or to the Bottle Handing System (BHS) or the Filtering System of the device. If the plug valve design is used, the plug is opened either directly or indirectly by a linear actuator (eg solenoid)

A standard off the shelf valve can be used instead of an integrated valve assembly.

The volume of the solution in the CMC is measured by a level sensor (2-1), as the level/volume of the CMC can be mathematically determined. The instrumentation section allows the pH sensor (2-7) to penetrate the CMC wall, which is sealed either with a sealant or a mechanical seal (2-7A). This section also houses the temperature sensor (2-6) and has room for additional sensors. The instruments can be located below or above the stirrer section, to prevent instrumentation from possible damage from the rotating stirrer (2-4).

The mechanical seal can be in the form of a threaded connection with o-rings or a compression fitting.

The stirrer is comprised of two parts, the external driver (2-5) and the internal stirrer (2-4). The internal stirrer is a magnetic bar (2-4), or equivalent, located within the CMC. The external driver (2-5) is located outside of the CMC and provides a rotating magnetic field around the CMC's centreline. This magnetic field interacts with the internal stirrer's permanent magnetic field, causing it to rotate about the CMC's centreline. An example of the external driver, as shown in the drawings, is a set of synchronized electromagnets that are timed to induce a rotating electromagnetic field.

Alternatively, one or more magnets are mounted on a bearing or a race-rail that is then rotated around the CMC's centreline using a motor or similar actuator and a coupling (belt, gear, etc).

Dedicated hard points support (2-12) all the weight of the CMC, its components and liquid solution.

Additionally a heating and cooling arrangement can be implemented to control the temperature of the solutions being created.

The material selected for the CMC and all the wetted surfaces needs to be compatible with the range of chemicals being handled, (material example: PET). The CMC is sized to hold the maximum desired liquid solution volume plus any additional space required to enable uniform mixing (for example the total CMC volume is 1.25 times the maximum desired liquid solution volume).

The CMC components have a degree of integration available to it. For example the valve can be either integrated into the CMC body or considered as a separate component. The same applies to the cleaning nozzle.

An alternative to the cleaning nozzle is to seal the CMC and flood/flush the CMC repeatedly until clean.

An additional option is to mount load cells on the legs to measure the weight of the CMC and solution. An alternative to leg supports with load-cells it to mount the CMC on a canter lever with integrated load-cells/strain gauges. It is also possible to mount all the legs on a single load-cell/scale.

Flush and Verification System (FVS)

The purpose of the Flush and Verification System (FVS) is to provide the device with an automated system to clean the CMC and the ability to verify the cleanliness of the CMC. This is achieved by providing pressurized water, with the option of adding detergent to the CMC, and measuring the conductivity, or equivalent, of the water leaving the CMC to measure the cleanliness.

Referring to FIG. 3, the FVS consists of:

Hot Water Generator with an optional storage (HWGS) (3-2)

Pressure pump (3-3)

Piping and tubing, and fittings

Cleanliness sensor like conductivity meter or equivalent (3-5)

Optional detergent tank and injection pump (3-6)

Alternatively, pressurized water can be provided externally making the pressure pump redundant.

The FVS is connected to the water supply, and can be isolated by using the inlet valve (3-1). This is to prevent leakage if the supply is accidentally disconnected, without following the draining procedure.

The water flows into the Hot water Generator and optional storage (HWGS) (3-2). The HWGS can be either a custom-made water tank with an installed electrical heater, or a flow through heater.

Depending on the water supply source specification, it is possible to replace the HWGS (3-2) with a flow through heater without storage. If the supply water is insufficient then the hot outlet of the HWGS (3-2) is connected to the pressure pump (3-3) inlet, and the pump outlet is connected to the CMC. Otherwise the hot outlet of the HWGS is connected to the CMC. The pump (3-3) is sized to provide the sufficient pressure and flow to clean the CMC, and will be dependent on the size of the CMC and its cleaning nozzle design. Any pump can be used, provided that it meets the flow and pressure requirements and is able to handle the hot water safely.

The water from the CMC will flow into the Drain station (3-4), which is connected to the drains. In the line a conductivity sensor (3-5), or equivalent, will be mounted to test the cleanliness of the water exiting the CMC.

The detergent option (3-6) consists of a detergent source, an injection pump and a check valve. The option can be implemented by installing a check valve on the connections between the hot water tank and pressure pump. The detergent can be stored either in an internal tank or an external tank/bottle, and is connected to an injection pump. The Injection pump will force the detergent into the water line between the check valve and the pump. The detergent needs to overcome the water pressure. The check valve is to prevent the detergent from flowing into the hot water tank. The detergent tank and injection pump can be combined into a syringe that the user will need to replace once it is empty.

Liquid Handing System

The purpose of the Liquid Handing System (LHS) is to accurately deliver a specified amount of liquid. These liquids include but are not limited to:
- Acid (various concentrations)
- Base (various concentrations)
- Water
- pH calibration liquids
- pH sensor storage solution
- Stock solutions (for example: chemicals that are only available in liquid form)
- Components that require to be added in liquid form for safety, dosing accuracy, etc requirements The LHS draws from various sources, which can be categorized:
- Continuous supply, (for example: water from the water mains)
- Internal supply (for example: integrated tanks)
- External supply (for example: storage bottles)

Referring to FIG. 4, the liquid is drawn in through, e.g. a peristaltic pump (4-2, 4-5, 4-7) and then pumped in controlled amounts into the CMC. The pumps configuration can be a single pump per CMC or one pump serving multiple CMCs. In the case of multiple CMCs, the liquid path will need to be controlled by either a single valve/selector or through a series of valves. The pumps are driven by either a geared/non-geared stepper motor (4-1, 4-4), a geared/non-geared DC motor (4-1, 4-4), or a linear driver (4-8).

The pumps used are of a positive displacement type, which include but are not limited to:
- Single peristaltic pump (4-5)
- Multiple channel peristaltic pump (4-2, 4-3)
- Syringe pump (4-7)
- Piston/plunger pump (4-7)
- Reciprocating pump (4-7)
- Diaphragm pump
- Screw pump
- Rotating lobe pump The pumps can be either self-priming, gravity-primed by placing the pump underneath the liquid source, or the liquid source (for example: water main line) can be pressurized.

A dosing valve or an alternative method of dosing specific amounts of liquids

The liquid sources, pumps, CMG are all connected by tubes (4-9). The tube material is selected to be suitable for the liquid contained within. The tubes connections can vary with each application, and include the following:
- Sealed. The tube is permanently sealed to the item using an adhesive and sealant that is resistant to the liquid handled.
- Mechanical Seal (MS). Referring to FIG. 5, the tube (5-1) is set in the tube holder (5-2) which in then either screwed (5-4) into or twist-locked into the base (5-5). An o-ring (5-3) ensures that there is no leakage, and can be install on any tube holder (5-2) and base (5-5) interface. Another option is to have a valve (5-6) incorporated in the base (5-5) that will be opened by the tube holder (5-2). The valve (5-6) will be closed by a spring (5-7) when the tube holder (5-2) is removed.
- Standard compression fitting
- Barbed fittings Control System The purpose of the control system (CS) is to control the operation of all systems in the device. The CS can be separated into:
1. Low level circuitry, comprising the hardware driver (e.g. stepper motor controller, power relays, etc)
2. Sensor information post-processing circuitry (e.g. current loop driver, Low noise amplifier, etc.)
3. Microcontroller/Microprocessor to control the low level circuitry
4. Touchscreen User Interface and CPU, running the program code and hosting the database structure Pivot Pipe The purpose of the Pivot Pipe (PP) is to direct the CMC discharge to the correct station. There will be at least two stations:
- Drain (for the FVS)
- Bottling station Other stations might include but are not limited to:
- pH sensor storage liquid recycle
- Filtering and bottling
- Degassing and bottling
- Analyzing (e.g. fluorescence analysis) and bottling Referring to FIG. 6, the gear holder (6-1) interfaces with the CMC outlet, with an o-ring (6-2) to creating a seal so that the CMC discharge does not leak out. The gear holder (6-1) has two thrust bearings (6-3) on the top and bottom of the gear holder (6-1), and has a bottom plate (6-5) that is bolted (6-8) to the top supporting plate (6-4). The thrust bearing (6-3) are set in grooves to ensure that they are correctly positioned and allows the gear holder to rotate freely. The gear holder (6-1) has a set of gears on the outer diameter and which interfaces with the pivot cog (6-6). The pivot cog is mounted on motor (6-7) that controls the rotation and position of the gear holder. A curved rigid pipe (6-9) is attached to the gear holder (6-1), and rotates with it. The liquid from the CMC flows through the rigid pipe (6-9) to the correct station. Limit switches can be used to confirm the position of the rigid pipe (6-9) discharge.

Other alternatives include systems that enable the correct positioning of a pipe (flexible or rigid). These could include linear systems or disposable systems.

It is possible to eliminate the need of the pivot pipe when the plug valve design is used.

Solid Handling System

The purpose of the Solid Handling System (SHS) is to accurately dose various chemicals in loose solid/powder form.

Referring to FIG. 7, the system comprises the following components:
- Solids Turn-Table (STT) (7-1) (or equivalent)
- Solids Container (7-2)
- Solids Dosing mechanism (SDM) (7-3)
- Delivery System (SDS) (7-4)
- Dosing mechanism driver (DMD) (7-4)
- Solids weighing scales (SWS) (7-4)

The solids can come various forms, which can include:
- Crystalline form
- Loose powder Clumpy powder The solids are held in the solid container (7-2). These solids container can either be a custom/purpose made or the original solids container. Each container has a SDM (7-3) mounted on the bottom of the container. The containers are located on a STT (7-1) or equivalent device that enables the desired solids container to be aligned with the desired CMC's solid's inlet. Once the container is in position the SDS (7-4) rises up and engages SDM (7-3). In the process the DMD (7-4) is connected to the SDM (7-4), and it is the DMD (7-4) that drives the SDM (7-3), and doses the solids in controlled amounts. The solids are dispensed onto the SWS (7-4), which is directly underneath the SDM (7-3). Once the right amount (mass) is dispensed, the SWS then deliver the solids into the CMC.

The SWS can be incorporated into the various aspects of the solid handling. For example it can be designed to measure the decreasing weight of the solid's container.

Referring to FIGS. 8 and 9, the STT can be a turn table (8-1 & 9-1) with the containers (8-5) attached at the circumference. The containers (8-5) can be held in place with a clip or slotted in place (8-4) or suspended of the table. The turn table (8-1) is support on thrust bearing (8-2) or equivalent, and the turn table (8-1) is rotated by a motor (8-3) that is mounted on the central axis.

Alternatively, a conveyor system can be implemented to fit more bottles in the same foot print area, with the added complexity. The turn table can be also be driven indirectly by a belt system Referring to FIG. 10, the SDM is composed of an adapter piece (10-2) that screws on to the container (10-1) that holds the solids. The rotating base (10-3) fits within the adapter (10-2), and the base holds the dosing screw (10-4). The rotating base (10-3) with the dosing screw (10-4) are able to freely rotate around the adaptor. The gear gate (10-6) has a slotted groove that fits on the rotating base (10-3). This allows the gear gate to move up and down. The springs (10-5) holds the gear gate in the closed position (down), and is opened by the when the SDS engages the SDM. The gear gate (10-6) has a set of gear on the outer diameter for the DMD with and through which to provide the rotational drive and control.

The gear gate (10-6) serves two purposes. The first is to provide the rotational drive and control to the rotating base (10-3) and dosing screw (10-4). The second is to close the container and internal workings of the SDM when the container is not engaged and is dosing solids. This also allows the container to be stored with solids in any position without leaking any solids.

When the dosing screw (10-4) is rotating, the exposed screw grabs onto the solids and carries the solid into the closed section of the screw. Once solid reaches the bottom of the screw, it is free to fall out of the screw and out though the open gate. If the solid sticks to the screw the motion of the solids above pushes the stuck solid out.

Another addition would be to incorporate a multi-variable flow through screw that can be selected by controlling the height of the gear gate.

Referring to FIG. 11, the DMD consists of a delivery tube (11-1) which houses the SWS (11-8, 11-9, 11-10, 11-11, 11-12). On top of the deliver tube sits the gear cog (11-3). The gear cog (11-4) is the one that mates with the gear gate (10-6), the gears are designed to be self-aligning. The gear cog is driven by a motor (stepper, DC, etc) via a gear, belt or equivalent. The threaded section of the tube (11-5) forms part of the lifting system. A lead gear (11-6) engages the tube threads (11-5) and is driven by a driving cog (motor driven) (11-7). This driving cog rotated the lead gear (11-6) which in turn drives the tube (11-1) up or down via the tube threads (11-5).

The SWS consists of a weight dish (11-8), which is attached to a weight sensor (11-9). The weight sensor is housed in a rotating case (11-10). The casing has a rotating axial (11-11) which rotates the weight dish, sensor and case. This rotation is driven by a motor, solenoid or equivalent (11-11). The axis (11-11) is hollow for the weight sensor (11-9) wires. A barrier (11-12) is put in place to protect the sensor from liquid and solid ingress, for example bellow. This barrier cannot restrict the movement of the dish nor hold any load.

An alternative is mount the weight sensor (11-9) outside the tube (10-1) to protect the sensor from any potential liquid, solid or corrosion damage.

Care needs to be taken as the solids might have the tendency to attach themselves to the tube (10-1) walls. The tube shape should be designed to eliminate or minimise this issue. Otherwise more active approaches include passive/active electrostatic barrier, non-stick paint or material, etc. However the inside of the tube (11-1) up to and including the SWS will be cleaned by the spray nozzle during the cleaning cycle.

Alternatively, other linear actuator systems can be used instead of the lead screw, to raise the platform.

ALTERNATIVE: Referring to FIG. 12, the DMD consists of a gear cog (12-6) mounted on a motor (10-5). The gear cog (12-6) is the one that mates with the gear gate (10-6), the gears are designed to be self-aligning. The DMD is then mounted on the raising platform (12-4) of the SDS. The platform (12-4) is raised by a lead screw assembly. This assembly consists of a screw nut (12-2) attached to the platform (12-4), which is set on the lead screw (12-1). The lead screw is rotated by the motor (12-3) that either rises or lowers the platform, which in turn either engages or disengages the SDM. Referring to FIG. 13, accurate dosing and application is achieved using the SWS (7-6). The SWS measures the solids dosed from the selected container. The SWS consists weighting dish (13-1), scales mechanism (13-2, 12-4A, 13-4B) (load cell or force compensated electromagnet) and a flipping mechanism (13-3). The flipping mechanism (13-3) can be either independent (dedicated driver) or dependent (a set of guides or mechanical linkages) of the raising platform (12-4). The SWS moves up and down in the axis of the CMC solid's inlet, and in the process rotates so that the weighting dish (13-1) is facing upwards to receive the solids from the SDM at the up position. The weight dish (13-1) rotates when in moves down so that the solids in the weighing dish are deposited into the CMC, and then the dish is able to close the CMC's solid inlet.

As mentioned before this system measures the solids dispensed from the solid containers. Another alternative is to measure the solid container as the solid is being dosed. This will require a different variation on the design.

Bottle Handling System

The purpose of the BHS, refer to FIG. 14 is to ensure that the right bottle is placed in the right position of the bottling station. The BHS also has the Bottle Labelling (14-5) system that marks the bottles with the necessary information.

There are various options for the bottle handling, from having a single bottle station to a fully automated system. Each system will include the following:

Bottle position

Position verification (14-3)

Bottle type (no bottle, empty bottle, full bottle) verification (14-3)

Additional systems can include:

RFID/Barcode reader (14-4)

Bottle storage

The Bottle Labelling system provides labels that can be attached to the chemical bottles. Alternatively, the labels can be automatically applied to the bottles or the information can be applied directly to the bottle (ink-jet).

The bottle is stored in the storage area until needed. A conveyer system takes a bottle to the filling station (14-3). On the way there might be a reader (14-4) which will verify the solution going into the bottle. At the filling station, the position of the bottle will be verified and whether the bottle is empty. Once confirmed the bottle can be filled with the newly created solution. Another conveyer system will take the bottle to pick-up area. On the way the bottle label/marking is applied. The conveyer system might consist of a belt or tape mechanism, or a cassette/magazine mechanism.

Alternatively the bottle handling can be simplified by manually placing the bottle in the filling stating and then applying the label manually.

The Filtration system can be integrated into the BHS, or it may be separate from the BHS.

Process Description

Whilst there are going to be slightly different processes for the various solutions (depending on the solution needs and chemistry process), the generic process will be as follows:

Flush and verify cleanliness of CMC

Start dosing the following in parallel: water, any components available as stock solutions, any components available in solid form. Dose water so that once dosing is complete, an estimated 80% of the end amount has been filled (barring chemical need of having more)

Stir during the whole period and stop once all the dosing is done and everything has dissolved Fill up to 99.9% of required volume Adjust pH with either liquid or solid components until target pH is reached, stirring during the process Output the solution (possibly to a bottle or other container)

Print a label for the container with all the critical information about its contents Store information about what was done to create traceability Start the clean cycle on the CMC in preparation for new solution When the device is not in use, a premade solution shall be pumped into the CMC to safely store the pH instrument. Before a new solution is made, the CMC needs to be drained and cleaned. Alternatives include pH instruments that can be stored in a dry environment.

Additionally the pH sensor is calibrated at regular intervals, using laboratory accepted standard solutions. A spot check calibration used one verified pH solution to check the reading. A complete calibration will used two or more verified pH solutions to correctly calibrate the pH sensor.

Although the present invention has been described hereinabove with reference to specific embodiments, the present invention is not limited to the specific embodiments and modifications will be apparent to a skilled person in the art which lie within the scope of the present invention. Any of the embodiments described hereinabove can be used in any combination.

The invention claimed is:

1. A method for generating a prepared solution, comprising:
   (a) storing a pH sensor in a mixing chamber filled with a storage solution configured to preserve the pH sensor;
   (b) separating the pH sensor from the storage solution;
   (c) dispensing at least one liquid from a plurality of different liquids and at least one solid from a plurality or different solids into the mixing chamber to yield a mixture;
   (d) sensing at least one characteristic of said mixture, said at least one characteristic including a pH value;
   (e) adjusting a quantity of said at least one liquid or said at least one solid based at least in part on the sensed pH value of the mixture, to yield said prepared solution having at least one target characteristic; and
   (f) dispensing said prepared solution having said at least one target characteristic, wherein (a)-(f) are performed automatically.

2. The method of claim 1, wherein said sensing comprises sensing more than one characteristic of said mixture.

3. The method of claim 1, wherein said sensing employs a solution sensor.

4. The method of claim 3, wherein said solution sensor comprises a turbidity sensor or a conductivity sensor.

5. The method of claim 1, wherein said sensing employs a weighing unit.

6. The method of claim 3, wherein said sensing comprises a calibration cycle of said solution sensor.

7. The method of claim 1, wherein the step of separating the pH sensor from the storage solution includes draining the storage solution from the mixing chamber.

8. The method of claim 1, further comprising a step of refilling the mixing chamber with an amount of the storage solution sufficient to store the pH sensor within the storage solution after the prepared solution is generated.

9. The method of claim 8, wherein the step of draining the storage solution from the mixing chamber during the generation of a prepared solution and the step of refilling the first chamber with the storage solution after the generation of a prepared solution is performed a plurality of times with the same storage solution.

10. The method of claim 1, wherein said prepared solution is dispensed into a bottle selected based at least in part on said at least one target characteristic.

11. The method of claim 1, wherein said dispensing of (f) comprises selecting a bottle from a plurality of bottles to receive said prepared solution.

12. The method of claim 11, further comprising, subsequent to (f), transporting said bottle comprising said prepared solution to a storage area.

13. The method of claim 1, further comprising receiving a request from a user interface to generate said prepared solution according to said at least one target characteristic.

14. The method of claim 1, further comprising selecting said at least one solid from said plurality of different solids based at least in part on said at least one target characteristic.

15. The method of claim 1, further comprising selecting the at least one liquid from the plurality of different liquids based at least in part on the at least one target characteristic.

16. The method of claim 1, further comprising the step of drying the mixing chamber using a controllable dryer configured to force air into the mixing chamber.

17. The method of claim 16, further comprising implementing a cleaning cycle that includes inputting a cleaning fluid into the mixing chamber and removing the cleaning fluid from the mixing chamber, and the step of drying the mixing chamber is performed after the cleaning fluid is removed from the mixing chamber.

\* \* \* \* \*